Dec. 21, 1954 R. C. SNEED 2,697,516
EGG WEIGHING TURRET
Filed Oct. 3, 1950 3 Sheets-Sheet 1
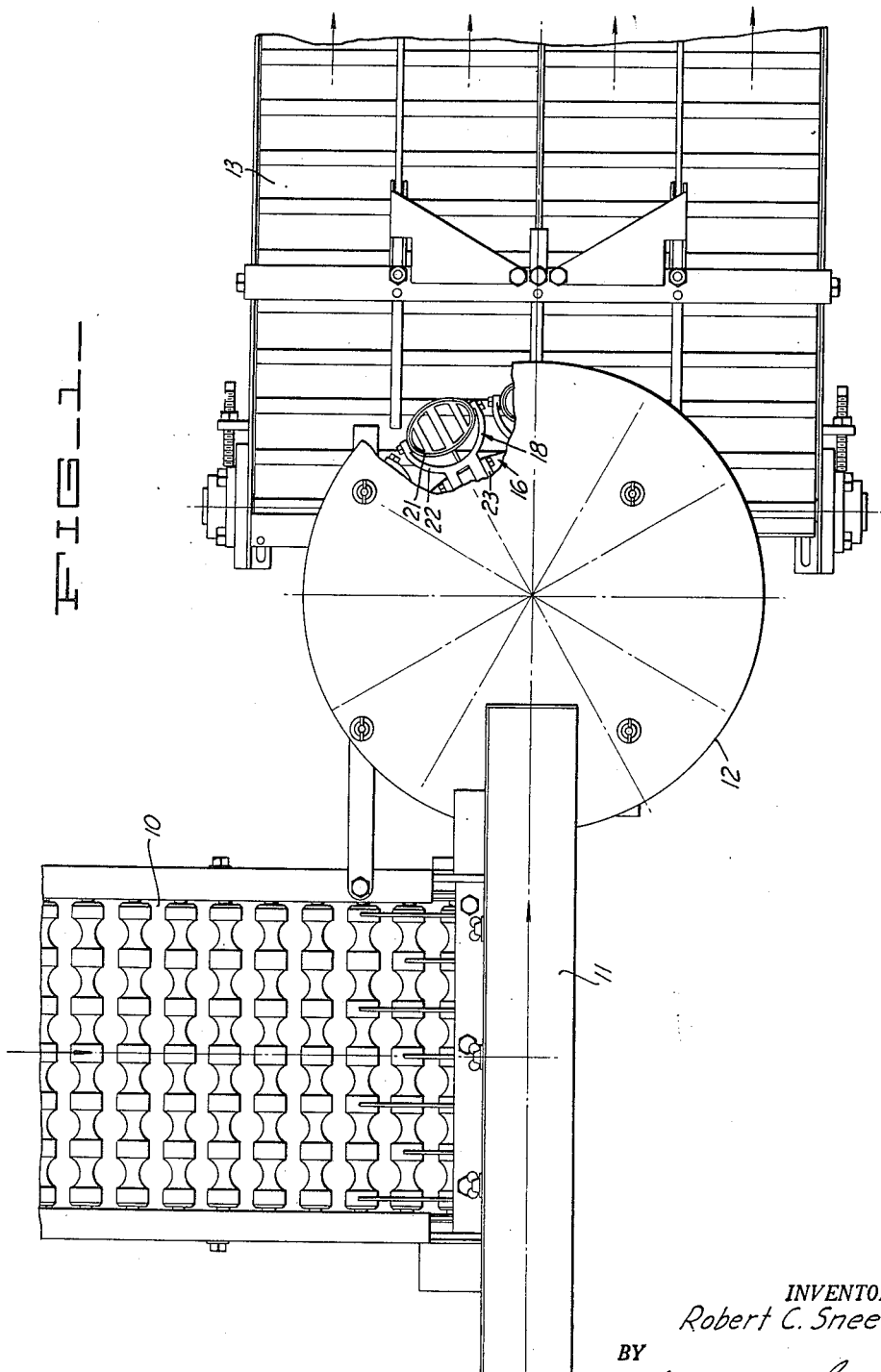
INVENTOR.
Robert C. Sneed
BY
ATTORNEYS

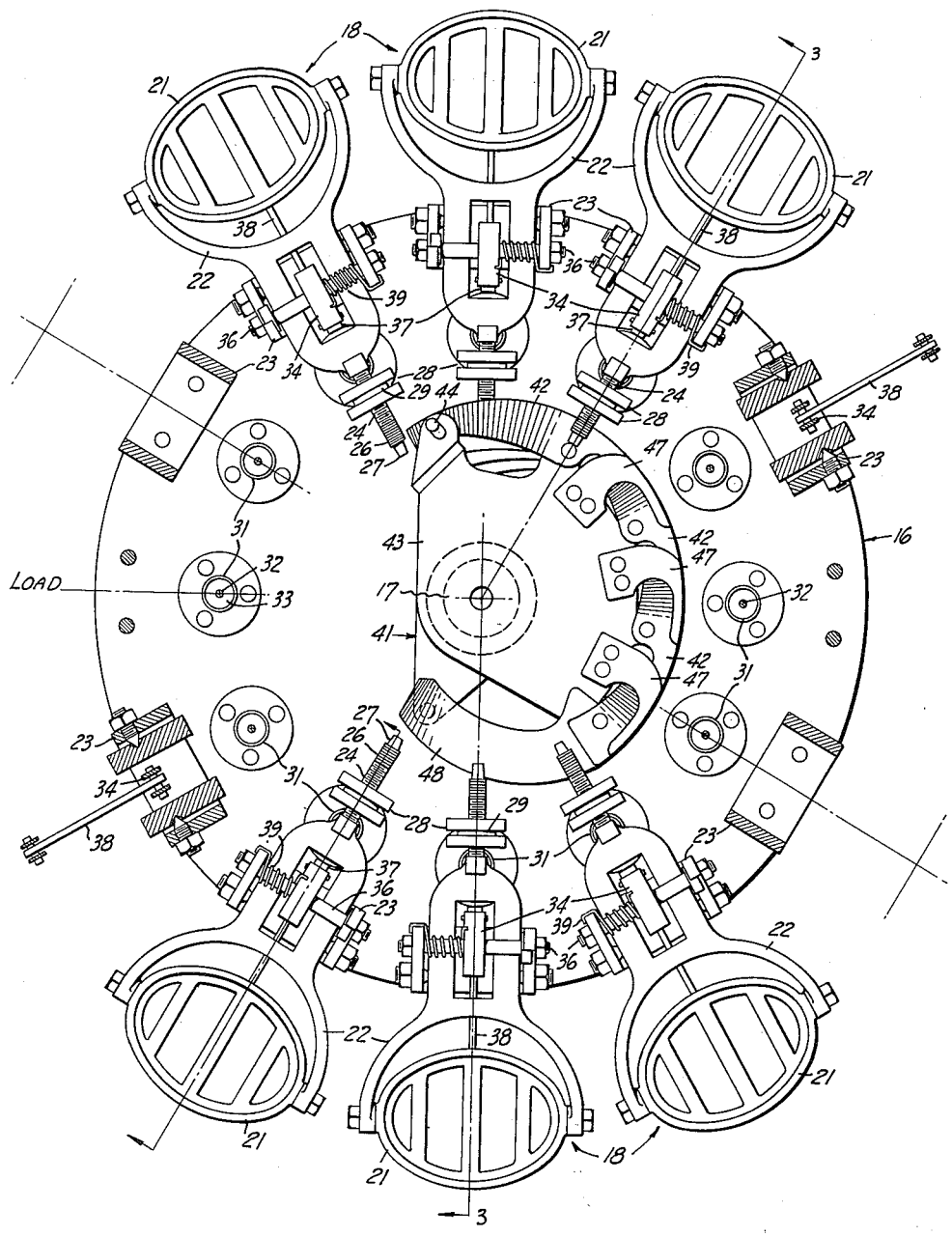
FIG_2_

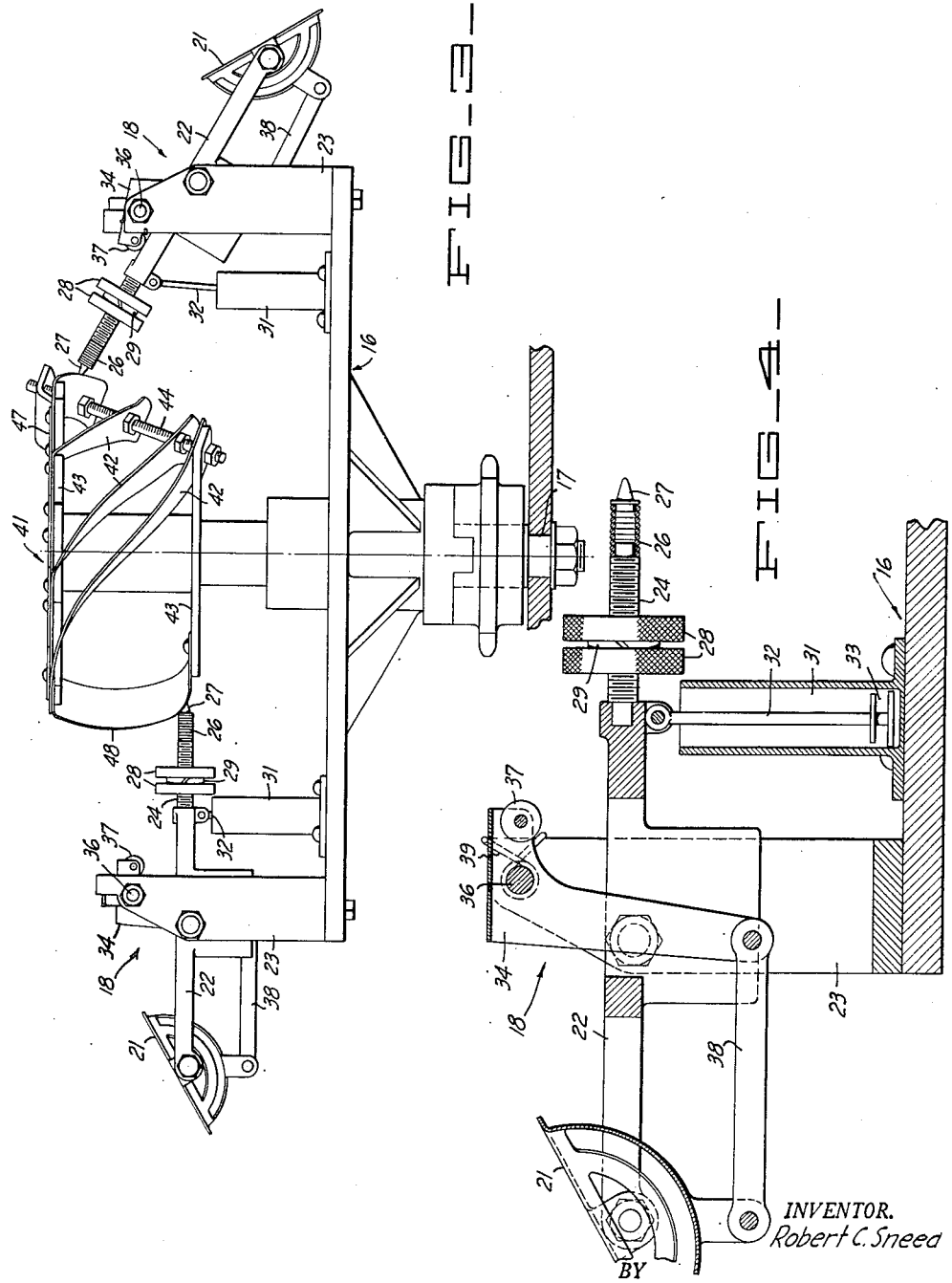

United States Patent Office 2,697,516
Patented Dec. 21, 1954

2,697,516

EGG WEIGHING TURRET

Robert C. Sneed, Piedmont, Calif., assignor to Safeway Stores, Incorporated, Oakland, Calif., a corporation of Maryland Application October 3, 1950, Serial No. 188,119

9 Claims. (Cl. 209—121)

This invention relates generally to egg weighing devices and particularly to an egg weighing turret assembly which is adapted to receive eggs one at a time, weigh them, and discharge them into predetermined carry-off mechanisms dependent upon their weight.

It is an object of the present invention to provide a device of this character which will be continually operating, as distinguished from step-by-step operation, and which is adapted to receive eggs of any size, determine their weight, and discharge them into predetermined carry-away mechanisms.

It is a further object of this invention to provide a device of this type which is provided with readily and accurately adjustable devices for means accurately weighing each egg.

It is a further object of this invention to provide a positive type of discharge device whereby, when the egg has been weighed, it may be discharged positively into its proper carry-away apparatus.

It is a further object of this invention to provide a device of this character which insures ejection of all eggs therefrom regardless of weight.

Other objects and advantages of this invention will appear from the following specification taken in conjunction with the accompanying drawings in which:

Figure 1 is a top plan view of a portion of an egg weighing machine showing the position of the egg weighing mechanism with respect to the remainder of the device;

Figure 2 is a top view of an egg weighing turret with some of the egg weighing and basket assemblies shown in detail, some in section and with some removed from the turret;

Figure 3 is a side elevation of the egg weighing assembly taken generally along the line 3—3 of Figure 2; and Figure 4 is an enlarged cross-sectional detail of an egg weighing and basket assembly.

Generally speaking, one type of egg weighing device with which this invention may be incorporated and used is illustrated in Robert C. Sneed application Serial No. 48,105, filed September 7, 1948, for "Egg Grading Machine." Such a machine consists generally of five units. The first unit is a longitudinal or multiple file conveyor mechanism 10 upon which eggs to be weighed may be placed as they are taken from the crates in which they are delivered. This conveyor is designed to center the eggs longitudinally and laterally and to transport them from the point at which they are placed thereon to a second unit which is referred to as the transverse or single file conveyor 11.

The single file conveyor 11 is positioned at one end of the longitudinal or multiple file conveyor 10 and is adapted to receive eggs therefrom and feed them one at a time to the third unit, the egg weighing turret 12.

The egg weighing turret 12 is aligned with the transverse conveyor 11 and consists generally of a rotating turret upon which a plurality of egg receiving baskets are mounted. The egg receiving baskets in turn cooperate with a scale mechanism to determine the weight of the egg and to discharge the egg at a particular station upon a fourth unit, the carry-off conveyor 13.

The carry-off conveyor consists generally of a horizontal conveyor adapted to carry eggs from the point at which they are placed thereon to a candling or packaging station where the operator performs a quality grading operation and places the eggs in appropriately labeled cartons.

All of the foregoing mechanisms or units may be driven by a single drive mechanism, not shown.

My invention relates to the egg weighing scale turret assembly 12 which consists generally of a turret 16 which is rotatably mounted upon a stationary vertical shaft 17 and which is adapted to be driven by a suitable gear connected to the drive mechanism previously referred to herein.

The rotatable turret 16 is provided with twelve scale and basket assemblies 18 which are spaced about its periphery generally as shown.

The egg scale and basket assemblies 18 consist generally of egg baskets 21 which are pivotally mounted in a yoke 22 which forms a balance beam. The yoke 22 is pivotally supported upon a scale beam support 23 in such a manner that the weight of an egg deposited in the egg basket 21 will be transmitted to and tend to elevate the opposite end of the balance beam or yoke 22 which, as indicated, is provided with a threaded stem 24, a lever supporting spring 26 and a cam engaging lever 27. Weights 28 are mounted upon the threaded stem 24 and may be moved longitudinally therealong. Between the weights 28 a lock washer 29 is provided so that, when the precise desired adjustment has been obtained, the weights 28 may be locked against further rotation.

The lever supporting spring provides a resilient mounting for a cam engaging point 27.

The turret 16 also provides support for a plurality of dash pots 31 whose purpose is to prevent too rapid operation of the egg basket. The dash pot rod 32 is secured to the lower side of the balance beam or yoke 22. It will be noted that the pistons 33 fit loosely within the dash pot 31 and serve only to dampen rather than to prevent operation of the weighing beam or yoke 22.

The means for finally ejecting the eggs from the egg basket 21 consists generally of an L-shaped scale trip arm 34 which is pivotally mounted upon a cross-shaft 36 supported by the scale beam support 23. The upper end of the L-shaped scale trip arm 34 is provided with a roller 37. The other end of the scale trip arm is pivotally secured to one end of a stabilizer bar 38, the other end of which is pivotally secured to the egg scale basket 21, as shown. The roller 37 is adapted to be engaged by the upper side of the yoke 22 and, when so engaged, to urge the L-shaped scale trip arm 34 up, thereby moving the scale stabilizer bar 38 laterally in such a manner as to tip the egg basket and eject the egg therefrom.

A torque spring 39 is also mounted upon the cross-shaft 36. One end of the torque spring 39 engages the L-shaped scale trip arm 34 while the other end engages the scale beam support 23. The torque spring 39 normally urges the L-shaped scale trip arm 34 to the egg receiving position illustrated in Figure 4.

The shaft 17 also serves as a support for a scale trip mechanism 41 which consists of a plurality of cam tracks 42 which are supported in spaced relationship between a pair of parallel horizontal plates 43. One end of each of the cam tracks 42 is provided with an orifice through which an adjusting threaded member 44 may be placed. Adjustment nuts 46 provide means whereby the height of the leading edge of each of the cam tracks 42 may be adjusted with respect to the turret 16 and to the cam engaging levers 27.

The upper ends of the cam tracks 42 are supported by the upper plate 43 and are secured thereto in any suitable manner. The plate 43 also provides a mounting for a plurality of balance beam holding members 47 which generally overlie the upper ends of the cam tracks 42 and whose function will more fully hereinafter be explained.

In addition to the cam tracks 42, the plates 43 also form a support for a scale trip release cam 48, as shown.

Operation of the device may briefly be described as follows: After eggs are placed upon the multiple file conveyor 10, they are deposited therefrom onto the single file conveyor 11. The single file conveyor 11 deposits eggs, one at a time, on the continually rotating egg weighing turret 12.

As the eggs are deposited from the single file conveyor on the egg basket 21, the weight of the egg causes the yoke 22 to pivot with respect to the scale beam support 23. As the egg basket 21 is lowered, the stabilizer bar 38 pivots with respect to the scale trip arm 34 and, by virtue of the action of the torque spring 39, does not at that time affect the position of the scale trip arm 34 which remains substantially stationary.

However, the weight of an egg in an egg basket 21 serves to overcome the effect of the weights 28 and the dash pot arrangement 31, and raises the cam engaging lever 27.

During the interval between the time at which the egg is first deposited in the egg scale basket 21 and the time at which the cam engaging lever 27 is balanced in a more or less fixed position, the turret 16 is being rotated both with respect to the vertical fixed shaft 17 and the scale trip mechanism 41. As the turret 16 and the egg baskets 21 continue to rotate, the cam engaging levers 27 will approach the zone of the forward edges of the cam tracks 42 and will engage one of them, depending upon the weight of the egg.

Generally speaking eggs are graded by weight and, as illustrated herein, the scale trip mechanism 41 is designed, by virtue of the fact that it provides or presents four cam tracks 42, to size the eggs into four groups. It is to be understood, however, that by varying the numbers of cam tracks 42, the numbers of groups into which eggs are to be divided may likewise be varied. In addition, by adjusting the levels or points at which the cam levers engage the cam tracks 42, that is, by raising or lowering the forward edges of the cam tracks 42, the weights of eggs to be placed in each class may likewise be varied. It is obvious that the greater the weight of the egg in the egg scale basket 21 the further the cam engaging lever 27 will be raised. Therefore, if the egg is a particularly heavy egg, it will lower the egg basket 21 and raise the cam engaging lever 27 whereby the lever 27 will engage the highest of the cam tracks 42. Should the egg be of less weight the cam engaging lever 27 will engage one of the other cam tracks 42. However, regardless of the size of the eggs, or as a matter of fact even if the egg basket 21 contains no egg, the cam engaging lever 27 will engage the lowermost of the cam tracks 42. Therefore, with each revolution of the turret 16, each cam engaging lever 27 will engage one of the cam tracks 42, serving to trip the egg basket 21 and eject an egg, or in the event there is no egg therein, to trip the basket.

Spring 26 supports cam engaging lever 27. The resilient support thus obtained prevents the cam engaging lever 27 from engaging the blunt forward end of one of the cam tracks 42 and jamming the machine should the cam engaging lever so strike a cam track 42, the resilient support of the lever will permit it to ride over the edge and engage the track 42.

As the cam engaging lever 27 engages one of the cam tracks 42, the turret and the entire scale and basket assembly will continue to rotate causing a camming action between the cam engaging lever 27 and the cam track 42 which it engages. Continued movement of the turret and the scale and basket assembly will cause the cam engaging lever to ride upwardly upon one of the cam tracks 42 until the yoke 22 engages the roller 37. As the yoke 22 engages the roller 37, the L-shaped scale trip arm 34 is caused to pivot about the cross-shaft 36 against the effect of the torque spring 39 and, through the stabilizer bar 38, to cause the egg scale basket 21 to pivot with respect to the yoke 22. As the egg scale basket 21 is caused to pivot with respect to the yoke 22, the contents thereof are deposited by gravity at that point, upon the carry-off conveyor 13. In other words, assuming that the cam engaging lever 27 engages the highest cam 42, the egg scale basket will be tripped at a point opposite the high point or upper end of that cam track 42. As the turret 16 and the scale and basket assembly 19 continue to rotate, the cam engaging lever 27 will ride over the surface created by the upper ends of the following cam tracks 42 and the holding members 47 and ultimately be lowered to egg receiving position as the cam engaging lever rides down the scale trip release cam 48.

Should the weight of the egg in the egg scale basket 21 be insufficient to raise the cam engaging lever 27 sufficiently high to engage the highest of the cam tracks 42, the cam engaging lever 27 will engage one of the following cam tracks, and will ride up the same thereby raising the yoke 22 until it engages roller 37 with the result that the egg within the egg basket 21 will be ejected at a point opposite the highest point on the particular cam 42 which the cam engaging lever 27 is following.

As the cam engaging lever 27 rides upwardly upon one of the tracks 42, it will engage one of the spring holding members 47. However, since the members 47 are made of resilient material, the cam engaging lever 27 will raise the device slightly, pass thereunder, and then ride over the upper ends of the following cams and the upper surfaces of successive holding members 47.

As the cam engaging lever 27 rides down the scale trip release cam 48, the weights 28 return the yoke in the egg scale basket to egg receiving position. The torque spring 39 returns the scale trip arm 34 to egg receiving position. Thus the egg receiving basket 21 is again positioned to receive another egg to be weighed from the single file conveyor 11.

In this manner every egg which is deposited in the egg scale baskets 21 from the single file conveyor 11 will be weighed and deposited in its proper position on the carry-off conveyor 13.

I claim:

1. In an egg weighing device, a vertical stationary spindle, a rotatable platform mounted upon said spindle and adapted to be continuously rotated with respect thereto, a plurality of scale and basket assemblies mounted upon said platform and equally spaced about its periphery, the baskets being mounted at the outer end of a pivotally mounted balance beam, the other end of said balance beam accommodating a plurality of balance weights and a cam engaging lever, a plurality of cam tracks mounted upon said spindle in the path of rotation of said cam engaging levers and adapted to engage the same and tip the balance beam with respect to the horizontal, each of said scale and basket assemblies including a trip arm adapted to be actuated by the balance beam to trip the basket when the cam engaging lever approaches the highest point upon said cams, and a trip release cam adapted to guide the balance beam back to normal position.

2. In an egg weighing device, a vertical stationary spindle, a rotatable platform mounted upon said spindle and supporting a plurality of scale and basket assemblies, the baskets being mounted in yokes at the outer end of a pivotally mounted balance beam, the other end of said balance beam accommodating a cam engaging lever, a plurality of cam tracks rigidly mounted upon said spindle, said cam tracks being in the path of rotation of said cam engaging levers and adapted to engage the same, each of said scale and basket assemblies including a trip arm adapted to be actuated by the balance beam to trip the basket when the cam engaging lever approaches the highest point upon said cams.

3. In a device of the character described, a stationary vertical spindle, a platform rotatably mounted upon said spindle and adapted to accommodate a plurality of scale and basket assemblies equally spaced about its periphery, each of said scale and basket assemblies comprising an egg receiving basket, a balance beam, balance weights, a cam follower and a trip lever, a plurality of cam tracks mounted upon said spindle in the path of rotation of said cam followers and adapted to be engaged thereby, means for adjusting the positioning of said cam tracks, said means comprising a common spindle passing through similar orifices in the leading end of each of said cam tracks, a lock nut above and below each of said cam tracks adapted to determine and secure the position of each of said cam tracks.

4. In an egg weighing machine, a vertical stationary spindle, a rotatable platform mounted upon said spindle and adapted to be continuously rotated with respect thereto, a scale trip mechanism mounted above said platform and on said spindle comprising an upper plate and a lower plate mounted on said spindle, a threaded member inclined at an angle between said plates and rigidly affixed thereto, deformable cam strips rigidly fastened to said upper plate and adjustably fastened to said threaded member, a trip release cam mounted between said upper and lower plates; a plurality of beam supports mounted on the periphery of said platform, a plurality of balance beams having yokes pivotally mounted on said beam supports, a plurality of egg baskets pivotally carried in said yokes at the outer ends of said balance beams, a plurality of arms extending downwardly from said baskets, a plurality of stabilizer bars pivotally connected at one end to the free ends of said arms, a plurality of cross shafts mounted at one end on said beam supports, a plurality of trip arms pivotally mounted on said cross shafts having one end pivotally connected to the other end of said stabilizer bars so that said stabilizer bars are substantially parallel to said balance beams, a plurality of springs mounted on said cross shaft engaging said beam supports and said trip arms to retain said basket in an egg holding position, a plurality of threaded stems on the inner ends of said balance beams, a plurality of weights threaded on said stems, a plurality of springs fitted on said stems, and a plurality of cam engaging levers fitted on said springs and adapted to engage said scale trip mechanism.

5. In a device of the character described, a plurality of scale and basket assemblies adapted to be mounted on a rotatable platform each comprising a beam support, a pivotally mounted balance beam having a yoke and mounted on said beam support, an inclined egg basket pivotally carried by the outer end of said balance beam, a rigidly attached arm extending downwardly from said basket, a stabilizer bar pivotally secured at one end to the free end of said arm, a cross shaft mounted on said beam support substantially at one end thereof, a trip arm pivotally mounted on said cross shaft having one end pivotally connected to the other end of said stabilizer bar so that said stabilizer bar is substantially parallel to said balance beam, a spring arm mounted on said cross shaft engaging said beam support and said trip arm to place said basket in egg receiving position, a threaded stem on the inner end of said balance beam, a balance weight threaded on said stem, a spring fitted on said stem, and a cam engaging lever fitted on said spring.

6. A device as in claim 5 together with a dash pot assembly comprising a cylinder having one end closed attached to said platform, a piston assembly, and a piston rod pivotally connected to the balance beam.

7. In an egg weighing device, a vertical spindle, a platform rotatably mounted on said spindle, a plurality of scale means mounted on said platform, having cam engaging elements thereon and adapted to receive eggs, scale trip mechanism arranged in the path of said elements to engage said elements for tripping said scales to discharge eggs therefrom, said scale trip mechanism comprising upper and lower spaced plates mounted on said spindle, a cam support member extending between said plates obliquely thereto, a plurality of non-parallel deformable cam strips each having one end fastened to the upper plate and the other end adjustably secured to said cam support member for adjustment therealong in said oblique direction.

8. A device as in claim 7 together with a trip release cam mounted between said upper and lower plates, said trip release cam being spaced from said deformable cam strips and being arranged to engage said elements and cause the gradual return of said scale means to an untripped position.

9. In an egg weighing device, a vertical stationary spindle, a rotatable platform mounted upon said spindle and adapted to be continuously rotated with respect thereto, a plurality of parallelogram means including balance beams pivotally mounted upon said platform and equally spaced about its periphery, an egg retaining basket pivotally mounted at the outer end of each of said balance beams, the other end of each of said balance beams accommodating a plurality of balance weights and a cam engaging lever, a plurality of cam tracks in the path of rotation of said cam engaging levers and adapted to engage the same to tip the balance beams, said parallelogram means serving to retain the baskets in an egg retaining position as the balance beam is tipped, and means in the path of one of said parallelogram means and operable to distort said parallelogram and tilt said basket to egg discharging position when said beams are tilted to a predetermined position by said cam tracks.

References Cited in the file of this patent

UNITED STATES PATENTS

| Number | Name | Date |
|---|---|---|
| 1,169,467 | Cutler | Jan. 25, 1916 |
| 1,355,999 | Nelson | Oct. 19, 1920 |
| 2,139,574 | Butterfield | Dec. 6, 1938 |
| 2,158,023 | Smith | May 9, 1939 |

FOREIGN PATENTS

| Number | Country | Date |
|---|---|---|
| 433,387 | Great Britain | Aug. 14, 1935 |
| 504,057 | Great Britain | Apr. 19, 1939 |